United States Patent
Li et al.

(10) Patent No.: US 9,817,564 B2
(45) Date of Patent: Nov. 14, 2017

(54) MANAGING A DISPLAY OF CONTENT BASED ON USER INTERACTION TOPIC AND TOPIC VECTORS

(71) Applicants: Wen-Syan Li, Fremont, CA (US); Gufei Sun, Shanghai (CN); Heng Wang, Shanghai (CN)

(72) Inventors: Wen-Syan Li, Fremont, CA (US); Gufei Sun, Shanghai (CN); Heng Wang, Shanghai (CN)

(73) Assignee: SAP SE, Walldorf (DE)

( * ) Notice: Subject to any disclaimer, the term of this patent is extended or adjusted under 35 U.S.C. 154(b) by 368 days.

(21) Appl. No.: 14/050,833

(22) Filed: Oct. 10, 2013

(65) Prior Publication Data

US 2015/0089358 A1 Mar. 26, 2015

(30) Foreign Application Priority Data

Sep. 26, 2013 (CN) .......................... 2013 1 0445660

(51) Int. Cl.
G06F 17/30 (2006.01)
*G06F 3/0485* (2013.01)
G06F 17/27 (2006.01)
G06F 9/44 (2006.01)

(52) U.S. Cl.
CPC .......... *G06F 3/0485* (2013.01); *G06F 9/4445* (2013.01)

(58) Field of Classification Search
CPC ........ G06F 17/30; G06F 15/173; G06F 3/048; G06F 17/212; G06F 3/0485; G06F 9/4445
USPC ................................................ 715/273, 258
See application file for complete search history.

(56) References Cited

U.S. PATENT DOCUMENTS

| | | | |
|---|---|---|---|
| 6,182,072 B1* | 1/2001 | Leak | G06F 17/30873 |
| 7,962,604 B1* | 6/2011 | Morris | G06Q 30/02 705/14.4 |
| 8,219,546 B2 | 7/2012 | Yan et al. | |
| 8,332,390 B2 | 12/2012 | Yan et al. | |
| 9,195,640 B1* | 11/2015 | Donneau-Golencer | G06F 17/28 |
| 9,336,192 B1* | 5/2016 | Barba | G06F 17/277 |
| 2004/0154040 A1* | 8/2004 | Ellis | H04N 5/44543 725/58 |
| 2006/0294453 A1* | 12/2006 | Hirata | G10L 15/26 715/203 |

(Continued)

OTHER PUBLICATIONS

"Section 3, Semantics, structure, and APIs of HTML documents, World Wide Web Consortium (W3C) ("HTML5, A vocabulary and associated APIs for HTML and XHTML", published on Jun. 10, 2010, hereafter W3C2010".*

(Continued)

*Primary Examiner* — Cesar Paula
*Assistant Examiner* — Jian Huang
(74) *Attorney, Agent, or Firm* — Fish & Richardson P.C.

(57) ABSTRACT

Techniques for managing display of content include identifying a document to present to a user on a graphical user interface (GUI); extracting at least one property of the document, the property including metadata associated with the document; determining a correlation between the document and one or more document topics associated with the user; determining an amount of time to display a portion of the document to the user through the GUI based at least in part on the property and the correlation; and displaying the portion of the document to the user through the GUI for the determined amount of time.

22 Claims, 5 Drawing Sheets

(56) References Cited

U.S. PATENT DOCUMENTS

| | | | |
|---|---|---|---|
| 2010/0169311 A1* | 7/2010 | Tengli | G06F 17/30864 707/736 |
| 2010/0312762 A1 | 12/2010 | Yan et al. | |
| 2010/0318495 A1 | 12/2010 | Yan et al. | |
| 2010/0318559 A1 | 12/2010 | Yan et al. | |
| 2010/0325281 A1 | 12/2010 | Li et al. | |
| 2011/0093852 A1 | 4/2011 | Li et al. | |
| 2011/0106743 A1* | 5/2011 | Duchon | G06F 17/30705 706/46 |
| 2011/0239104 A1* | 9/2011 | Prasad | G06F 11/3684 715/234 |
| 2011/0314233 A1 | 12/2011 | Yan et al. | |
| 2012/0330975 A1* | 12/2012 | Lee | G06F 17/30029 707/749 |
| 2013/0006988 A1 | 1/2013 | Li et al. | |
| 2013/0066455 A1 | 3/2013 | Li et al. | |
| 2013/0066774 A1 | 3/2013 | Li et al. | |
| 2013/0117752 A1 | 5/2013 | Li et al. | |
| 2013/0173568 A1* | 7/2013 | Josifovski | G06F 17/30864 707/706 |
| 2014/0006921 A1* | 1/2014 | Gopinath | G06F 17/241 715/230 |
| 2014/0129299 A1* | 5/2014 | Daya | G06Q 10/06 705/7.41 |

OTHER PUBLICATIONS

West et al. "Automatically Suggesting Topics for Augmenting Text Documents," CIKM'10, Oct. 25-29, 2010, copyright, 2010 ACM 978-1-4503-0099-5/10/10.*

* cited by examiner

MANAGING A DISPLAY OF CONTENT BASED ON USER INTERACTION TOPIC AND TOPIC VECTORS

CROSS REFERENCE TO RELATED APPLICATION

This application claims priority under 35 U.S.C. §119 to Chinese Patent Application 201310445660.6, filed Sep. 26, 2013, the entire contents of which are incorporated by reference herein.

TECHNICAL BACKGROUND

This disclosure relates to management of display of content, and more particularly, to management of the scrolling speed for a document displayed on a graphical user interface (GUI).

BACKGROUND

Electronic reading is a commonly performed activity on many devices. However, in many cases, a document displayed on a screen by a text editor or a browser is too long to be viewed in its entirety. In general, a user can make lower lines visible by scrolling or paging. Conventional scrolling and paging methods requires the input of a user, such as pressing a "Page Down" key, or clicking a mouse on a vertical line-scrolling slider bar provided by the editor or browser. Furthermore, a user frequently desires to scroll through a document at a variable speed—for example, slowly at the beginning of an on-line newspaper article, and more quickly thereafter. In many applications, the speed and consistency of the scrolling depend upon the user's ability to manipulate a pointer, controlled by a mouse, with respect to the slider bar; either holding the pointer steady, or moving the pointer at a constant rate up or down the slider bar.

In some cases, a user might prefer to use auto paging or auto scrolling. However, a particular constant speed for auto paging or auto scrolling is not recommended because of the variety of user reading speeds and different reading habits corresponding to different kinds of content. Consequently, conventional auto paging function requires the user to frequently adjust the auto paging speed. Some auto paging or auto scrolling methods include personalized speed adaptation relying on additional hardware components. For example, some methods use a camera to track the eyeball activity to identify the location of the text read by the user, and therefore scroll down or flip the page when the user finished reading the current page. The major drawback of these approaches is the requirement of additional sensors.

SUMMARY

The present disclosure relates to computer-implemented methods, software, and systems for managing display of content by, for instance, managing a scrolling speed of content displayed on a GUI. In one general embodiment, a method for managing display of content includes identifying a document to present to a user on a graphical user interface (GUI); extracting at least one property of the document, the property including metadata associated with the document; determining a correlation between the document and one or more document topics associated with the user; determining an amount of time to display a portion of the document to the user through the GUI based at least in part on the property and the correlation; and displaying the portion of the document to the user through the GUI for the determined amount of time.

Other general embodiments include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general embodiments, the portion includes a first portion.

A second aspect combinable with any of the previous aspects further includes, subsequent to expiration of the determined amount of time, displaying a second portion of the document to the user through the GUI for the determined amount of time.

A third aspect combinable with any of the previous aspects further includes receiving feedback from the user during display of the first or second portions of the document through the GUI for the determined amount of time; based on the received feedback, adjusting the determined amount of time; and displaying a third portion of the document to the user through the GUI for the adjusted amount of time.

In a fourth aspect combinable with any of the previous aspects, the received feedback includes at least one of a command to change the GUI from displaying the second portion of the document to the first portion of the document subsequent to expiration of the determined amount of time, or a command to change the GUI from displaying the first portion of the document to the second portion of the document prior to expiration of the determined amount of time.

A fifth aspect combinable with any of the previous aspects further includes identifying a plurality of historical documents from a database; displaying, sequentially, each of the plurality of historical documents to the user; for each displayed historical document, receiving at least one characteristic of the displayed historical document from the user; based at least in part on the received characteristic, assigning a topic to the displayed historical document; and determining a display time associated with the topic based on user feedback.

In a sixth aspect combinable with any of the previous aspects, the property includes at least one of a length of the document, a source of the document, an author of the document, or a priority status of the document.

In a seventh aspect combinable with any of the previous aspects, the portion of the document includes a page of the document.

Various embodiments of a computing system according to the present disclosure may provide one or more of the following features. For example, the system for managing display of content may facilitate the scrolling and paging of a document automatically. The managing display of content system may also facilitate the automatic adaptation of the display speed to particular user preferences based on document type. The accuracy of auto scrolling and auto paging speed can increase with the number of portions of documents displayed for a particular user based on the processing and integration of the user preferences. The system for managing display of content is software based; therefore the system for managing display of content does not require any additional hardware components. As yet another example, the system for managing display of content may be implemented in any type of electronic device configured to include a document reader.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

In general, some embodiments of the present disclosure are directed to managing display of a document's content for users of electronic devices including a graphical user interface (GUI). The electronic device displays reading content of a document (or other viewable image with text) that has been identified in a local storage medium or it has been retrieved on demand through a networking service. In particular, embodiments of the present disclosure are directed to displaying a portion of the document to the user through the GUI for a determined amount of time. If the document includes multiple portions, each portion is displayed (e.g., automatically) for the determined amount of time. In some examples, each portion of the document that is to be displayed in the GUI is associated with a correlation coefficient and a property.

Figure 1:
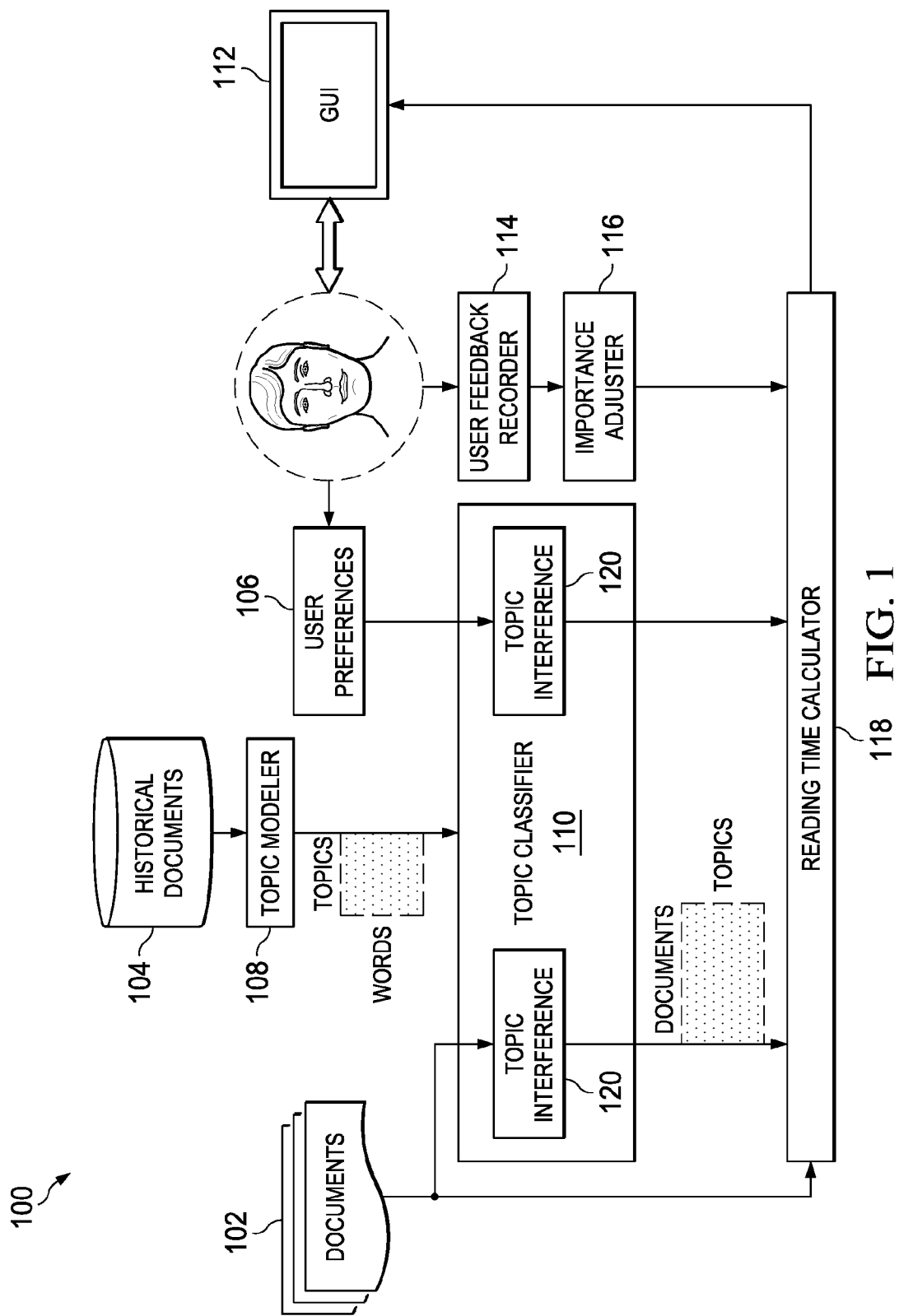
FIG. 1 is a block diagram of an example computing architecture for managing display of content.

FIG. 1 illustrates a block diagram 100 of an example computing architecture for managing display of content. For example, in some embodiments, the diagram 100 can be used to process an input to display a document for a determined time. The input in the diagram 100 can include a document 102, historical documents 104 and user preferences 106. The diagram 100 can further include a plurality of components to process the input. The processing components of the diagram 100 can include a topic modeler 108, a topic classifier 110, a graphical user interface 112, a user feedback recorder 114, an importance adjuster 116 and a reading time calculator 118, as shown in this figure.

As illustrated, each of the processing components can receive one or more inputs. For example, the topic modeler 108 receives historical documents 104 as input and generates a topic model as output. The topic classifier 110 can use as input the model parameters, the document 102 to be displayed and user preferences 106. The importance adjuster 116 can use as input data provided by the user feedback recorder. In some embodiments, the reading time calculator 118 can integrate all inputs to determine the display time for the document 102. The reading time calculator 118 can receive as input the document's properties from the document 102, the topic, as generated by the topic classifier 110 and the importance of the document, as generated by the importance adjuster 116.

In some embodiments, the documents used as input according to the block diagram 100 can carry the information to be displayed. In some examples, the documents include only text. In other examples, the documents can include both images and text. In some embodiments, the reading time calculator 118 determines the display time based on the textual content. For example, the time allocated for displaying an image can be a constant. The time allocated for displaying the textual content can vary for different topics. A document can include multiple topics. For example, a document can include a mixture of various topics and can be characterized by a particular set of topics. In some embodiments, historical documents 104 can be used by the topic modeler 108 to perform a training process in topic modeling. The topic modeler 108 can generate a topic model based on all historical documents 104 available in the historical documents database. The topic model can be a matrix formed of words and topics extracted from the historical documents 104. The topic model can include a plurality of model parameters. The topic modeler 108 can update an existing topic model by processing newly added historical documents 104 including new words and new topics.

In some embodiments, the time allocated for displaying the textual content can also vary based on user preferences 106. User preferences 106 can be used by the topic classifier 110 to identify the importance of the documents 102. The topic classifier 110 can calculate a score for each topic. The score can be a numerical value within a particular range. For example, a document 102 that includes a favorite topic can be classified with a high score. In some embodiments, the topic classifier 110 can determine an overall score for the entire document and a plurality of scores corresponding to the number of portions of document that are displayed. The overall score for the entire document can be an average of the plurality of scores corresponding to the topics identified in the document. In some embodiments, the topic classifier 110 can include one or more topic inference tools 120. Each topic inference tool 120 can be used to receive a particular input, for example user preferences 106 or documents 102. In some embodiments, the output of the topic classifier 110 can be a matrix of documents and topics, which can be sent to the reading time calculator 118.

In some embodiments, the time allocated for displaying the textual content can also vary based on user feedback. The integration of user feedback in the computing architecture for managing display of content enables personalized adaptation of display time. For example, a user can read an interesting novel faster than a financial report. As another example, a user can read a particular document slower or faster than usual due to subjective factors, such as emotional or physical factors or existence of external distractions. The system for managing display of content can be adapted to integrate personal factors in the calculation of the display time by recording user feedback. For example, particular user interventions, such as pause and scroll back can be associated to the intention of carefully reading the displayed document. As another example, a jump to the next page and a forward scroll can be associated to the intention of skimming the displayed document. Every modification of the automatic display time performed by the user can be recorded by the user feedback recorder 114 and sent to the importance adjuster 116. The importance adjuster can adjust the score of portions of document corresponding to the identified topic.

In some embodiments, the reading time calculator 118 integrates a plurality of inputs for determining the display time for a portion of a document 102. For example, the reading time calculator 118 can integrate the topic score, user preferences and user feedback to determine the display time. The reading time calculator 118 can also integrate additional objective factors to determine the display time. Objective factors can include document characteristics, display characteristics, source type and priority. For example, document characteristics can include length, longer documents requiring a longer display time. Display characteristics can include font size, larger fonts, requiring less reading time. The source type can refer to the author of the document, important source deserving more attention. The priority attribute of a document can be included in the metadata associated to the document. When existent, the priority attribute is used to update the display time accordingly.

Figure 2:
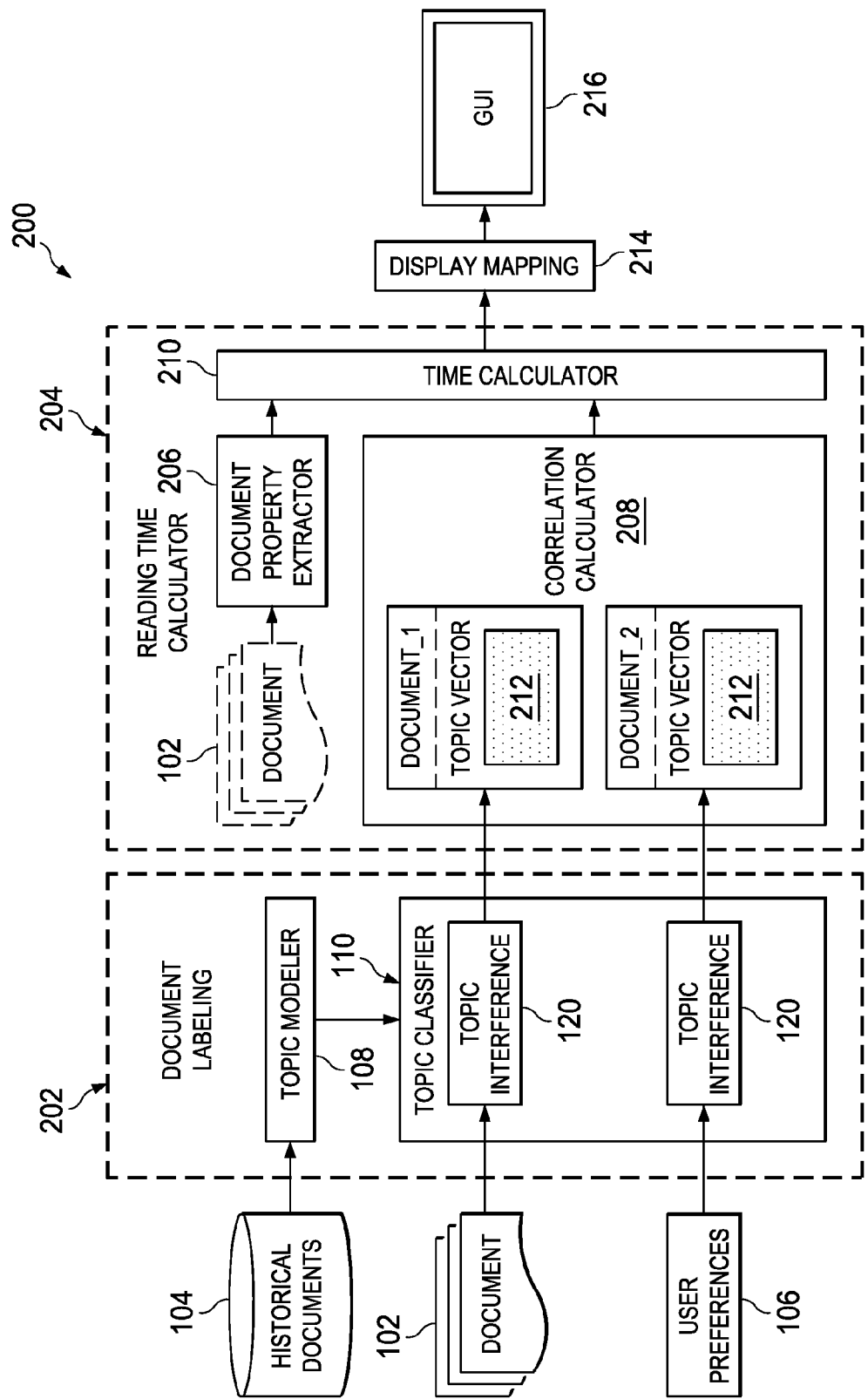
FIG. 2 is a block diagram of a portion of the example computing architecture of FIG. 1 that includes a reading time calculator.

FIG. 2 is a block diagram of a portion of the example computing architecture of FIG. 1 that can be used to calculate the display time. In some embodiments, the system for managing the display time includes two components: a document labeling module 202 and a reading time calculator 204. The document labeling module 202 can include the topic modeler 108 and the topic classifier 110. The reading time calculator 204 can include a document property extractor 206, a correlation calculator 208 and a time calculator 210.

As illustrated, document labeling module 202 can use as input historical documents 104, one or more documents 102 to be displayed and user preferences 106. The document labeling module 202 can perform a statistical analysis of the received input data. For example, the topic modeler 108 can include a statistical method configured to discover the topics that occur in a collection of documents. The topic modeler 108 can determine a set of topics to represent each of the historical documents 104. The identified set of topics can be organized in a topic model. For example, the topic modeler 108 can generate a hierarchical topic model. As another example, the topic modeler 108 can generate a labeled topic model.

In some embodiments, the topic modeler 108 can represent each of the historical documents 104 by a vector including a particular word frequency. The topic modeler 108 can generate a matrix based on all historical documents 104. The matrix size can be given by the number of words and the number of documents, being represented as $N_{words} \times N_{docs}$. The number of words and/or phrases included in the topic model can be relatively small, for example, several hundreds of thousands. The number of documents can be very large. For example, the number of historical documents can be continuously increased, by adding to the historical documents database, each document displayed to a user. In some embodiments, topic modeler 108 can automatically generate a labeled topic model without requiring a user input. For example, an unlimited number of documents can be retrieved from internet and used by the topic modeler 108 to generate the labeled topic model.

In some embodiments, the topic modeler 108 can also generate a word-topic matrix. The word topic matrix can be a probabilistic distribution of words on different topics. The word topic matrix can be sent to the topic classifier 110 for representing the documents with a mixture of various topics. The topic classifier 110 can process user preferences 106, including a combination of favorite keywords, as a normal document. The topic classifier 110 can generate a topic vector 212 for each received document (e.g., the document 102 to be displayed and each historical document 104). The topic vector 212 can be a positive real K-dimensional vector corresponding to a document. The topic vector 212 can indicate the relation between each topic and the corresponding document. The dimension of the vector K can represent the number of topics. Each dimension of the vector can correspond to a separate topic.

The output generated by the topic classifier 110, for example the document including the topic vector 212, can be sent to the reading time calculator 204. In some embodiments, the component of the reading time calculator 204 processing the document including the topic vector 212 can be the correlation calculator 208. The correlation calculator 208 can determine the correlation between a document and the favorite topics based on the topic vector. For example, a document can be represented as:

$$d_i = [t_{1i}, t_{2i}, \ldots, t_{ki}]$$

The document 102 to be displayed can be denoted by $d_{input}$ and the favorite topics represented based on the topic vector can be denoted by $d_{preference}$. The correlation calculation includes a comparison of the topic vectors. In some examples, the correlation calculation includes a cosine similarity measure that provides a quantitative measure of how similar two documents are in terms of their topics:

$$\cos\theta = \frac{d_{input} \cdot d_{preference}}{\|d_{input}\| \|d_{preference}\|}$$

The intersection of the vectors can be denoted by $d_{input} \cdot d_{preference}$. The norm of vector $d_{input}$ can be denoted by $\|d_{input}\|$. The norm of vector $d_{preference}$ can be denoted by $\|d_{preference}\|$. The vectors used by the correlation calculator 208 are positive. Consequently, the cosine similarity of two documents can range from 0 to 1. A cosine similarity of zero indicates that the document 102 to be displayed $d_{input}$ and the favorite topics vector $d_{preference}$ are orthogonal and different from each other. Consequently, the cosine similarity of zero indicates the document 102 to be displayed was not qualified by the user as being interesting. A cosine similarity of one indicates that the vectors have the same orientation. Consequently, the cosine similarity of one indicates the document 102 to be displayed qualifies as highly interesting for the user.

The output of the correlation calculator 208 can be the determined numerical value, which can be converted by the time calculator 210 in a display time. In some embodiments, the time calculator 210 combines the input received from the correlation calculator 208 with the input received from the document property extractor 206. The document property extractor 206 can determine a display time weight based on additional subjective or objective properties (as described with reference to FIG. 1). The time calculator 210 can continuously receive input from the document property extractor 206, which can update the document properties automatically, based on user feedback. The output generated by the time calculator can be a temporal coefficient, which can be converted to temporal metrics by the display mapping 214. The display mapping 214 can also generate a trigger to initiate the display of the following portion of the document 102.

Figure 3:
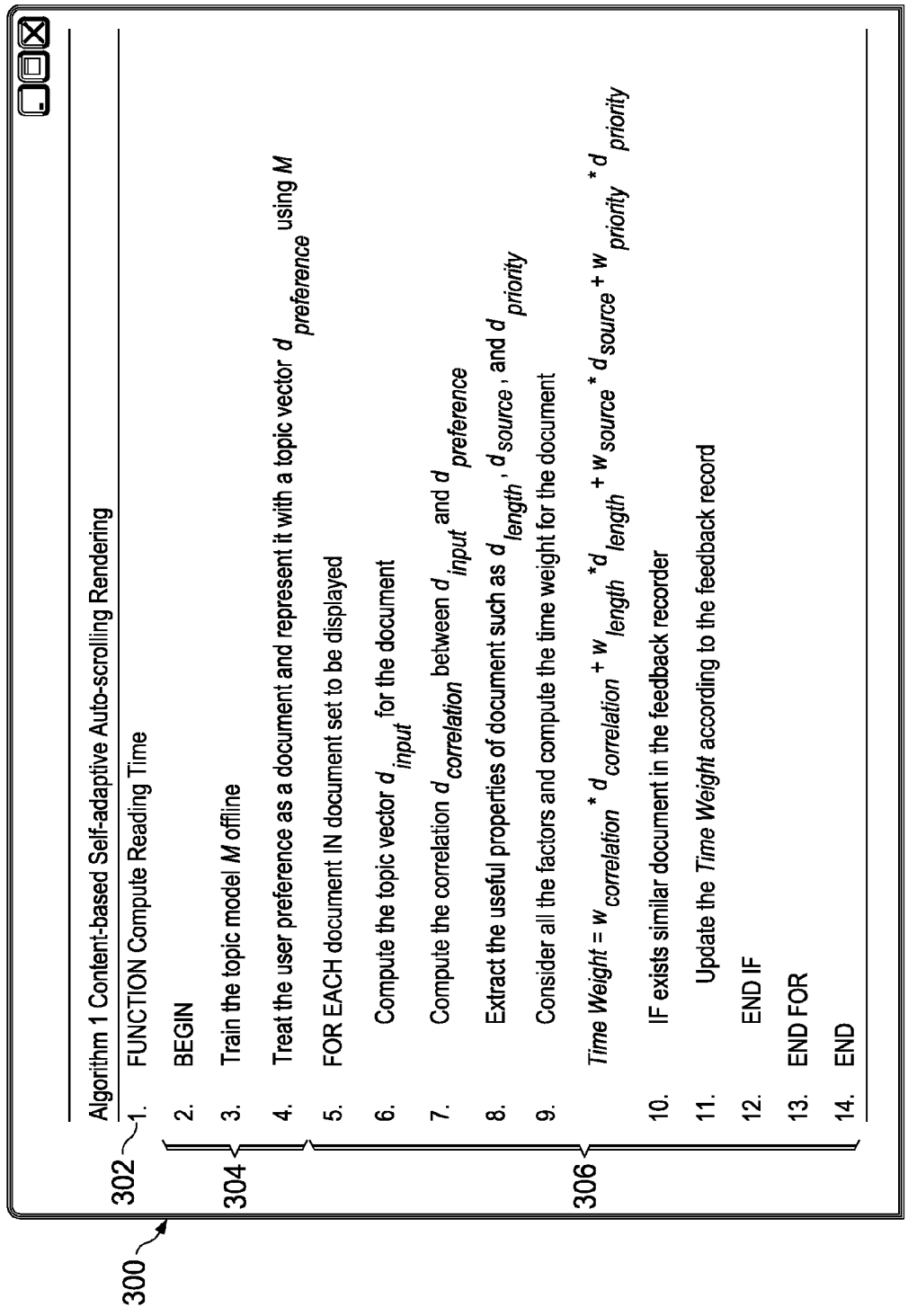
FIG. 3 illustrates a portion of an example pseudo code that implements one or more techniques for managing display of content.

FIG. 3 illustrates a portion of an example pseudo code 300 that implements one or more techniques for managing display of content. The pseudo code 300 can be used to personalize the system for managing display of content. For example, the pseudo code 300 includes instructions for integrating a user feedback in the system for managing display of content to refine the output of the automatic calculation of display time.

In some embodiments, the integration of user feedback in the system for managing display of content can be controlled by a function compute reading time 302. The function compute reading time 302 can include a preamble 304 instructing the system for managing display of content to train the topic model M. In some embodiments, training the topic model can be performed offline. The function compute reading time 302 can also include a loop 306 for displaying a plurality of portions of documents. For each document, the function compute reading time 302 can instruct the component of user feedback recorder to record user preferences. The function compute reading time 302 can treat user preferences as a document. For example, each user preference can be represented by a topic vector $d_{preference}$ using the topic model M. Recorded user preferences can include the increase or the decrease of the display time for a portion of a document.

In some embodiments, the function compute reading time 302 can instruct the transmission of the user preferences to the importance adjuster component of the system for managing display of content. For example, if the user interacted with GUI to speed up the reading process or to flip the page to the next document, the function compute reading time 302 can instruct the importance adjuster component to reduce the importance of the related topics. The reduction of the importance of the related topics can result in a time weight decrease of the related documents. The function compute reading time 302 can instruct the system for managing display of content to record each user preference and update the time weight for all portions of documents including similar topics. The calculation of the time display for incoming portions of documents can be automatically adjusted following the instructions of the function compute reading time 302. The function compute reading time 302 can integrate user preferences to increase the accuracy of auto scrolling and auto paging speed for the user.

Figure 4A:
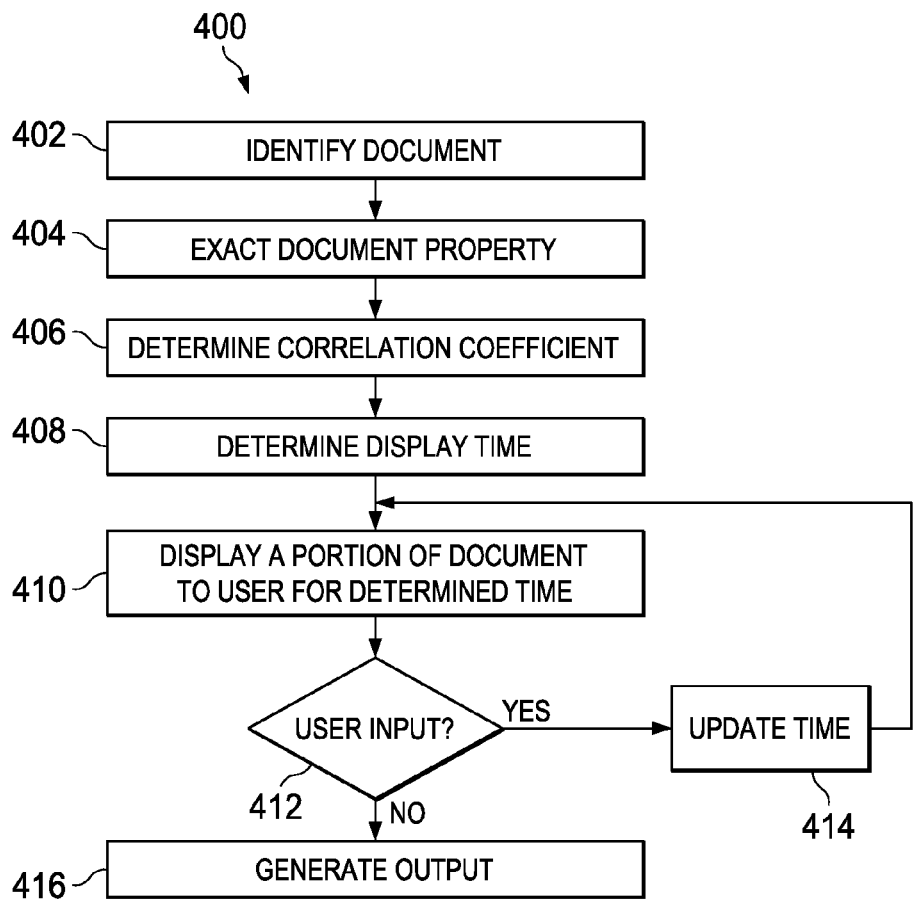
FIGS. 4A and 4B are flow charts that illustrate methods for managing display of content.

FIG. 4A is a flow chart 400 that illustrates a method for managing display of content. A document to be displayed to a user on a GUI is identified at step 402. For example, the document to be displayed can be a part of a set of documents selected for display. The set of documents can include historical documents stored in a database. Each document of the selected set can be sequentially displayed to the user. A document can include multiple portions of document. A portion of document selected for display can include a bookmark. For example, a user reading a long document, such as a novel, can include bookmarks for facilitating transition between multiple reading episodes.

The properties of the document or portion of document are extracted at step 404. Different portions of the document can have different properties (e.g., different topics) or identical properties. In some embodiments, the properties can be extracted from a metadata associated with the document or by processing the words and phrases included in the document. A correlation between the document and one or more document topics associated with the user preferences are determined at step 406. The correlation coefficient and the properties can be used to determine an amount of time to display a portion of the document to the user through the GUI at step 408. The portion of the document is displayed to the user through the GUI for the determined amount of time at step 410.

In some examples, feedback can be received from the user during the display of the portion of the document through the GUI for the determined amount of time at step 412. The determined amount of time can be adjusted based on the received feedback 414. The feedback can include a command to change the GUI from displaying the second portion of the document to the first portion of the document subsequent to expiration of the determined amount of time. The feedback can also include a command to change the GUI from displaying the first portion of the document to the second portion of the document prior to expiration of the determined amount of Upon the expiration of the determined time, a trigger may be generated at step 416. The trigger can include the verification of the existence of successive portions of the document. Each of the plurality of portions of document can be sequentially displayed to the user. After the display of the last portion of a document, the trigger can generate the verification of the existence of other documents within the selected set of documents for display.

Figure 4B:
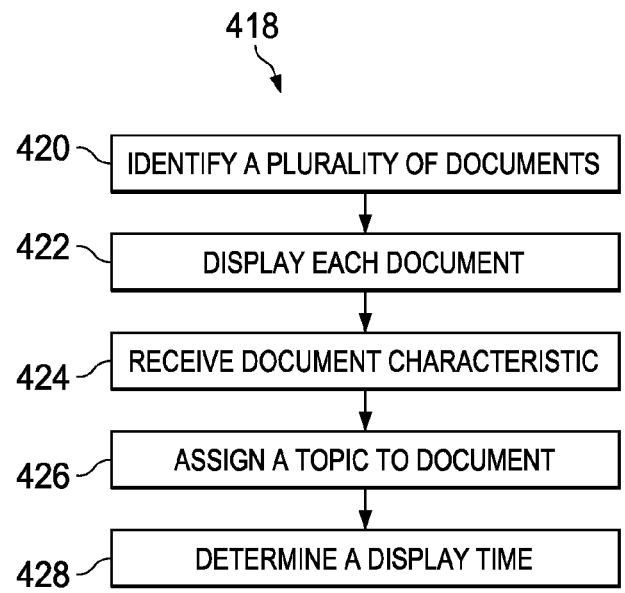

FIG. 4B is a flow chart 418 that illustrates a method for managing display of content. A plurality of historical documents from a database are identified at step 420. Each of the plurality of historical documents can be sequentially displayed to the user at step 422. For each displayed historical document, at least one characteristic of the displayed historical document can be received from the user 424. Based at least in part on the received characteristic, a topic to the displayed historical document can be assigned at step 426. A display time associated with the topic based on user feedback can be determined at step 428.

Figure 5:
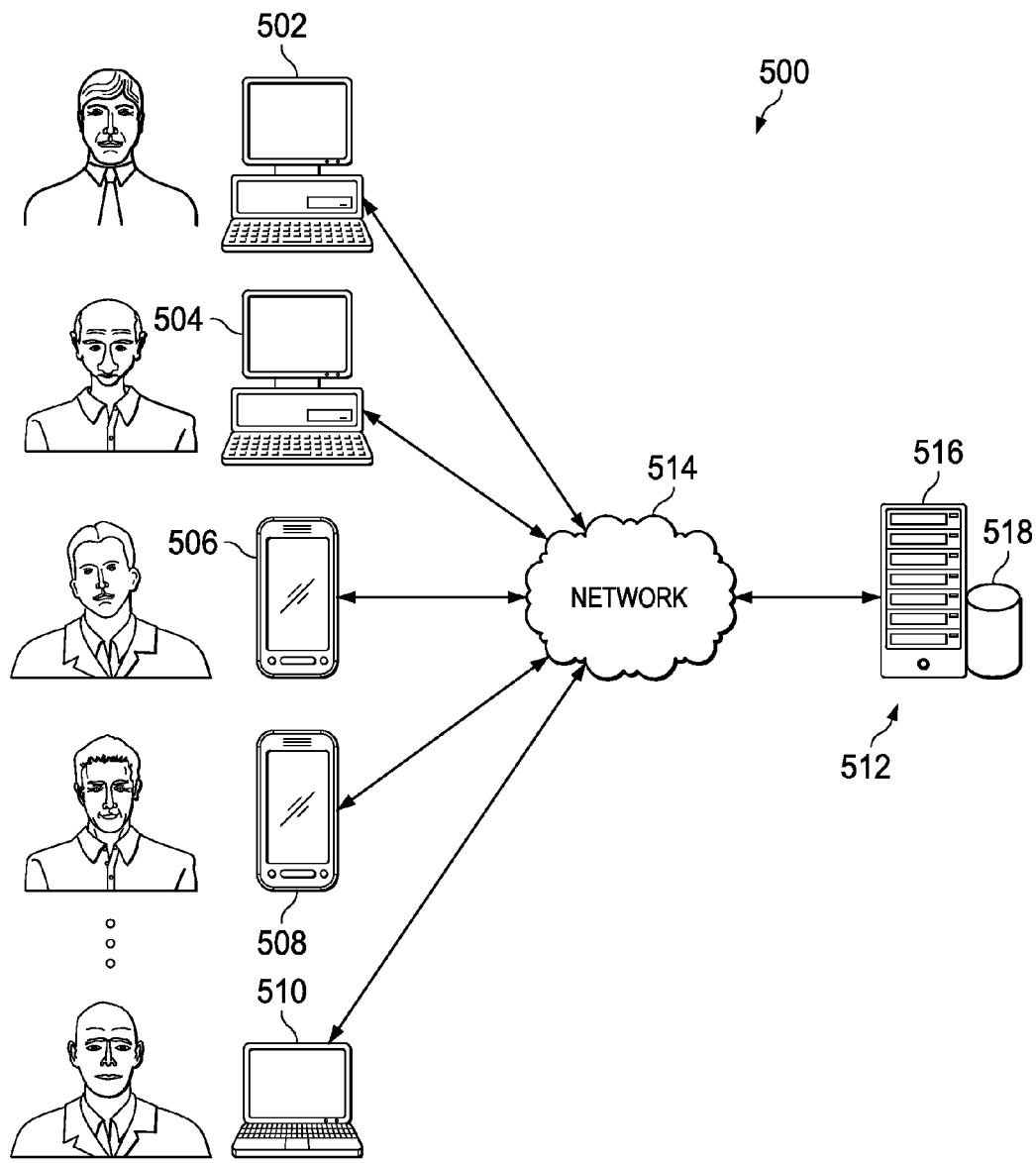
FIG. 5 is a diagram of an example system architecture for managing display of content.

FIG. 5 is a diagram of an example system architecture 500. The system architecture 500 includes a number of client devices 502, 504, 506, 508, 510 communicably connected to a server system 512 by a network 514. The server system 512 includes a processing device 516 and a data store 518. The processing device 516 executes computer instructions for managing display of content using user preferences and historical documents stored in the data store 518 to perform the functions of auto scrolling and auto paging.

Users interacting with the client devices 502, 504, 506, 508, 510 can select a document to be displayed using the computer-implemented method for managing display of content, locally installed or provided by one or more service providers. Examples of computer-implemented services for managing display of content can include a local reading service, a social networking reading service, and a document display sharing service. The local reading service can manage the display of document stored within the client devices 502, 504, 506, 508, 510 or documents retrieved over the network 514. Users can participate in the social networking reading service provided by the server system 512 by distributing digital content, such as text comments (e.g., updates, announcements, replies). Users interacting with the client device 502, 504, 506, 508, 510 can use the document display sharing service provided by the server system 512 to enable users to share data, while communicating with each other (e.g., during a teleconference or an online class). A single user can also access a particular document to be displayed from different client devices 502, 504, 506, 508, 510 (e.g., from a smartphone while travelling and a laptop or desktop computer while being at home).

In some embodiments, the client devices 502, 504, 506, 508, 510 can be provided as computing devices such as laptop or desktop computers, smartphones, personal digital assistants, portable media players, tablet computers, or other appropriate computing devices that can be used to communicate with an electronic social network. In some embodiments, the server system 512 can be a single computing device such as a computer server. In some embodiments, the server system 512 can represent more than one computing device working together to perform the actions of a server computer (e.g., cloud computing). In some embodiments, the network 514 can be a public communication network (e.g., the Internet, cellular data network, dialup modems over a telephone network) or a private communications network (e.g., private LAN, leased lines).

Implementations of the system architecture 500, as shown, can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, (e.g., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some embodiments, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example Linux, UNIX, Windows, Mac OS, Android, iOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a central processing unit (CPU), a FPGA (field programmable gate array), or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN), a wide area network (WAN), e.g., the Internet, and a wireless local area network (WLAN).

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single implementation. Conversely, various features that are described in the context of a single implementation can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order (e.g., FIGS. 4A-4B), this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments, alterations, and permutations of the described embodiments are within the scope of the following claims as will be apparent to those skilled in the art. For example, the actions recited in the claims can be performed in a different order and still achieve desirable results.

Accordingly, the above description of example embodiments does not define or constrain this disclosure. Other changes, substitutions, and alterations are also possible without departing from the spirit and scope of this disclosure.

What is claimed is:

1. A computer-implemented method of managing display of content, comprising:
    identifying a plurality of documents, for each document in the plurality of documents:
        determining a first topic associated with a first portion of the document based on extracting metadata associated with the document;
        determining a second, differing topic associated with a second, differing portion of the document based on textual content of the second portion;
        generating a first topic vector associated with the document based on the first and the second topics, the first topic vector indicating respective relations between the first and the second topics and the document;
        generating a second topic vector associated with one or more keywords associated with the user;
        determining a correlation between the document and one or more keywords based on a comparison of the first topic vector and the second topic vector; and
        determining a time weight for the document, the time weight indicating an amount of time to display a portion of the document to the user through a GUI based at least in part on the correlation;
    displaying a particular portion of a first document of the plurality of documents to the user through the GUI for the respective determined amount of time;
    during the display of the particular portion of the first document, identifying a user interaction with the particular portion of the first document, and a particular topic associated with the particular portion of the first document, the particular topic being one of the first topic and the second topic, the user interaction including an adjustment to the determined amount of time of display of the particular portion of the first document;
    generating a user interaction topic vector based on the user interaction;
    identifying a second, differing document of the plurality of documents;
    comparing the user interaction topic vector with a topic vector associated with the second document;
    based on the comparing the user interaction topic vector with the topic vector associated with the second document, updating a time weight for a portion of the second document that is associated with the particular topic; and
    after displaying the particular portion of the first document, displaying the second document of the plurality of documents to the user through the GUI for the updated time weight.

2. The computer-implemented method of claim 1, wherein the particular portion comprises the first portion, the method further comprising:

subsequent to expiration of the respective determined amount of time, displaying the second portion of the first document to the user through the GUI for the respective determined amount of time.

3. The computer-implemented method of claim 2, further comprising:

receiving feedback from the user during display of the first or second portions of the first document through the GUI for the determined amount of time;

based on the received feedback, adjusting the respective determined amount of time; and displaying a third portion of the first document to the user through the GUI for the adjusted amount of time.

4. The computer-implemented method of claim 3, wherein the received feedback comprises at least one of a command to change the GUI from displaying the second portion of the first document to the first portion of the first document subsequent to expiration of the respective determined amount of time, or a command to change the GUI from displaying the first portion of the first document to the second portion of the first document prior to expiration of the respective determined amount of time.

5. The computer-implemented method of claim 1, further comprising:

identifying a plurality of historical documents from a database;

displaying, sequentially, each of the plurality of historical documents to the user;

for each displayed historical document, receiving at least one characteristic of the displayed historical document from the user;

based at least in part on the received characteristic, assigning a topic to the displayed historical document; and determining a display time associated with the topic based on user feedback.

6. The computer-implemented method of claim 1, wherein the property comprises at least one of a length of the document, a source of the document, an author of the document, or a priority status of the document.

7. The computer-implemented method of claim 1, wherein the particular portion of the first document comprises a page of the first document.

8. A computer program product encoded on a non-transitory storage medium, the product comprising non-transitory, computer readable instructions for causing one or more processors to perform operations for managing display of content, the operations comprising:

identifying a plurality of documents, for each document in the plurality of documents:

determining a first topic associated with a first portion of the document based on extracting metadata associated with the document;

determining a second, differing topic associated with a second, differing portion of the document based on textual content of the second portion;

generating a first topic vector associated with the document based on the first and the second topics, the first topic vector indicating respective relations between the first and the second topics and the document;

generating a second topic vector associated with one or more keywords associated with the user;

determining a correlation between the document and one or more keywords based on a comparison of the first topic vector and the second topic vector;

determining a time weight for the document, the time weight indicating an amount of time to display a portion of the document to the user through a GUI based at least in part on the correlation;

displaying a particular portion of a first document of the plurality of documents to the user through the GUI for the respective determined amount of time;

during the display of the particular portion of the first document, identifying a user interaction with the particular portion of the first document, and a particular topic associated with the particular portion of the first document, the particular topic being one of the first topic and the second topic, the user interaction including an adjustment to the determined amount of time of display of the particular portion of the first document;

generating a user interaction topic vector based on the user interaction;

identifying a second, differing document of the plurality of documents;

comparing the user interaction topic vector with a topic vector associated with the second document;

based on the comparing the user interaction topic vector with the topic vector associated with the second document, updating a time weight for a portion of the second document that is associated with the particular topic; and after displaying the particular portion of the first document, displaying the second document of the plurality of documents to the user through the GUI for the updated time weight.

9. The computer program product of claim 8, wherein the particular portion comprises the first portion, the operations further comprising:

subsequent to expiration of the respective determined amount of time, displaying the second portion of the first document to the user through the GUI for the respective determined amount of time.

10. The computer program product of claim 9, wherein the operations further comprise:

receiving feedback from the user during display of the first or second portions of the first document through the GUI for the determined amount of time;

based on the received feedback, adjusting the respective determined amount of time; and displaying a third portion of the first document to the user through the GUI for the adjusted amount of time.

11. The computer program product of claim 10, wherein the received feedback comprises at least one of a command to change the GUI from displaying the second portion of the first document to the first portion of the first document subsequent to expiration of the respective determined amount of time, or a command to change the GUI from displaying the first portion of the first document to the second portion of the first document prior to expiration of the respective determined amount of time.

12. The computer program product of claim 8, wherein the operations further comprise:

identifying a plurality of historical documents from a database;

displaying, sequentially, each of the plurality of historical documents to the user;

for each displayed historical document, receiving at least one characteristic of the displayed historical document from the user;

based at least in part on the received characteristic, assigning a topic to the displayed historical document; and determining a display time associated with the topic based on user feedback.

13. The computer program product of claim 8, wherein the property comprises at least one of a length of the document, a source of the document, an author of the document, or a priority status of the document.

14. The computer program product of claim 8, wherein the particular portion of the first document comprises a page of the first document.

15. A system of one or more computers configured to perform operations comprising:
   identifying a plurality of documents, for each document in the plurality of documents:
      determining a first topic associated with a first portion of the document based on extracting metadata associated with the document;
      determining a second, differing topic associated with a second, differing portion of the document based on textual content of the second portion;
      generating a first topic vector associated with the document based on the first and the second topics, the first topic vector indicating respective relations between the first and the second topics and the document;
      generating a second topic vector associated with one or more keywords associated with the user;
      determining a correlation between the document and one or more keywords based on a comparison of the first topic vector and the second topic vector;
      determining a time weight for the document, the time weight indicating an amount of time to display a portion of the document to the user through a GUI based at least in part on the correlation;
   displaying a particular portion of a first document of the plurality of documents to the user through the GUI for the respective determined amount of time;
   during the display of the particular portion of the first document, identifying a user interaction with the particular portion of the first document, and a particular topic associated with the particular portion of the first document, the particular topic being one of the first topic and the second topic, the user interaction including an adjustment to the determined amount of time of display of the particular portion of the first document;
   generating a user interaction topic vector based on the user interaction;
   identifying a second, differing document of the plurality of documents;
   comparing the user interaction topic vector with a topic vector associated with the second document;
   based on the comparing the user interaction topic vector with the topic vector associated with the second document, updating a time weight for a portion of the second document that is associated with the particular topic; and
   after displaying the particular portion of the first document, displaying the second document of the plurality of documents to the user through the GUI for the updated time weight.

16. The system of claim 15, wherein the particular portion comprises the first portion, the operations further comprising:
   subsequent to expiration of the respective determined amount of time, displaying the second portion of the first document to the user through the GUI for the respective determined amount of time.

17. The system of claim 16, wherein the operations further comprise:
   receiving feedback from the user during display of the first or second portions of the first document through the GUI for the determined amount of time;
   based on the received feedback, adjusting the respective determined amount of time; and
   displaying a third portion of the first document to the user through the GUI for the adjusted amount of time.

18. The system of claim 17, wherein the received feedback comprises at least one of a command to change the GUI from displaying the second portion of the first document to the first portion of the first document subsequent to expiration of the respective determined amount of time, or a command to change the GUI from displaying the first portion of the first document to the second portion of the first document prior to expiration of the respective determined amount of time.

19. The system of claim 15, wherein the operations further comprise:
   identifying a plurality of historical documents from a database;
   displaying, sequentially, each of the plurality of historical documents to the user;
   for each displayed historical document, receiving at least one characteristic of the displayed historical document from the user;
   based at least in part on the received characteristic, assigning a topic to the displayed historical document; and
   determining a display time associated with the topic based on user feedback.

20. The system of claim 15, wherein the property comprises at least one of a length of the document, a source of the document, an author of the document, or a priority status of the document.

21. The system of claim 15, wherein the particular portion of the first document comprises a page of the first document.

22. The computer-implemented method of claim 1, wherein determining the correlation further comprises determining an intersection of the first topic vector and the second topic vector.

* * * * *